Figure 1:
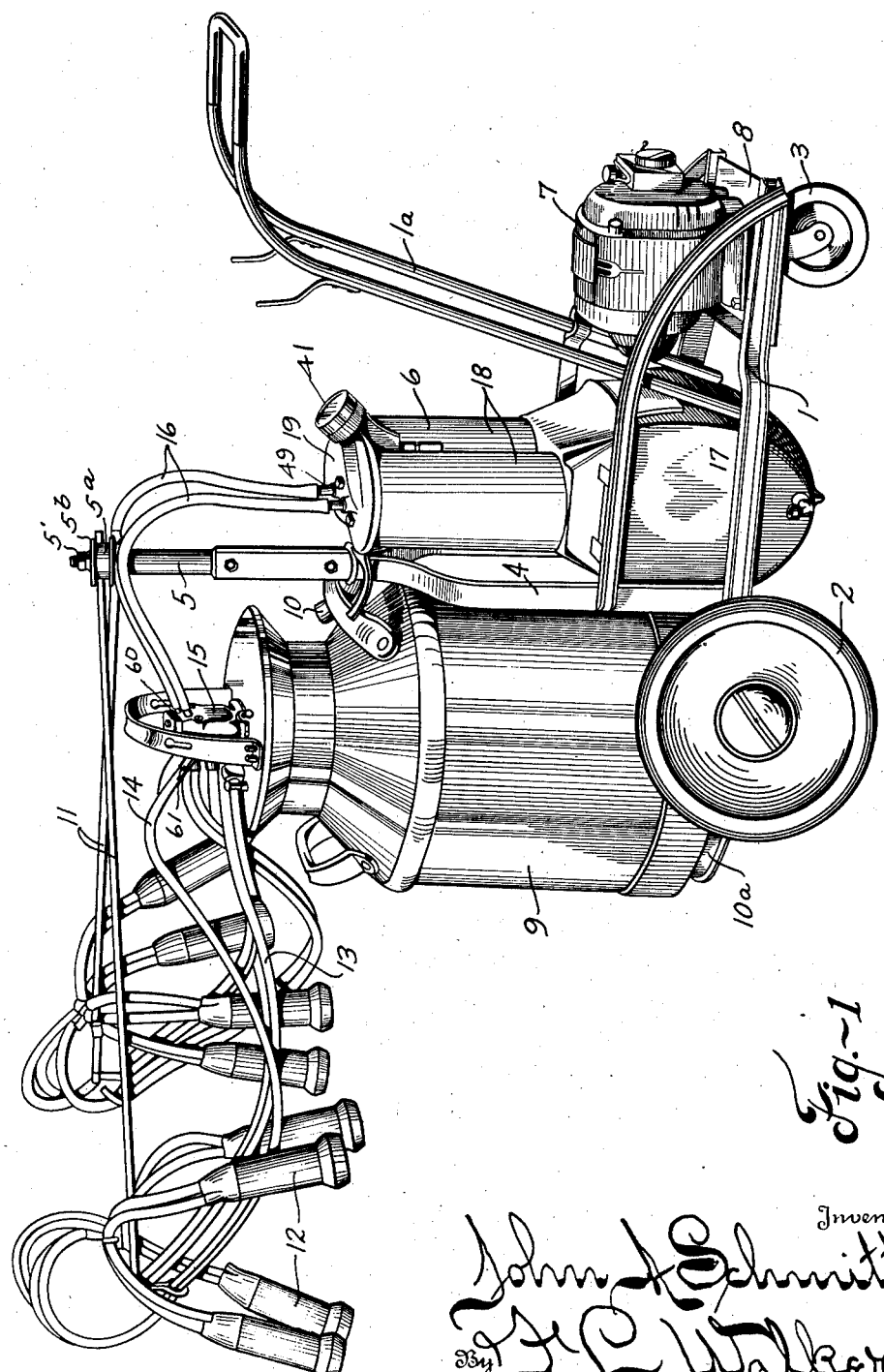

Nov. 7, 1944.　　J. A. SCHMITT　　2,361,970
MILKING APPARATUS
Filed Aug. 2, 1940　　4 Sheets-Sheet 1

Inventor
John A. Schmitt
By F. L. Walker
Attorney

Nov. 7, 1944.　　　　J. A. SCHMITT　　　　2,361,970
MILKING APPARATUS
Filed Aug. 2, 1940　　　　4 Sheets-Sheet 2
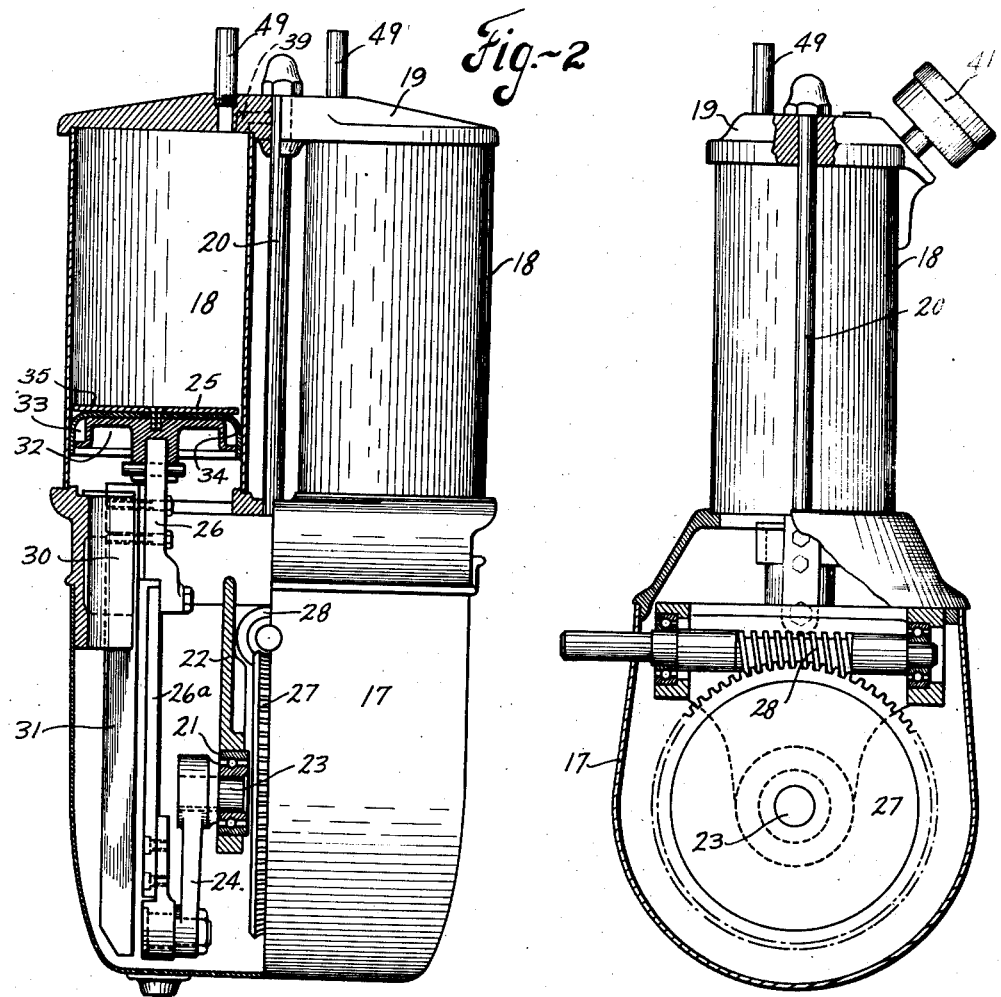
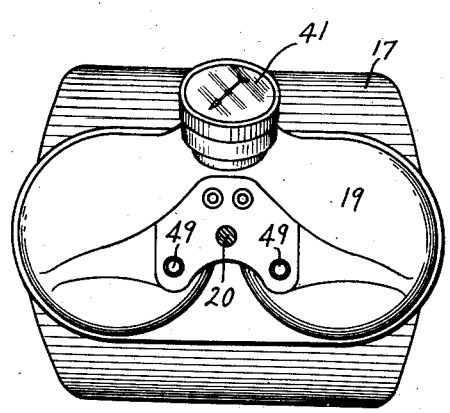
Inventor
John A. Schmitt
By F. L. Walker
Attorney Nov. 7, 1944. J. A. SCHMITT 2,361,970
MILKING APPARATUS
Filed Aug. 2, 1940 4 Sheets-Sheet 3
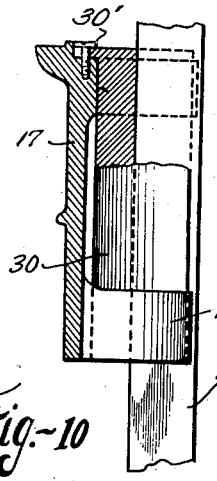
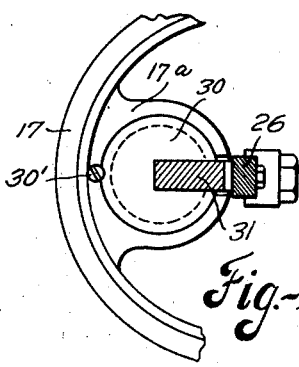
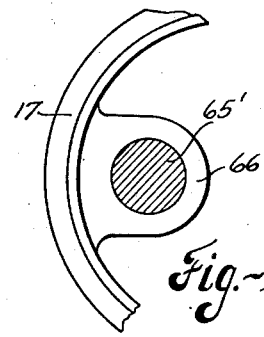
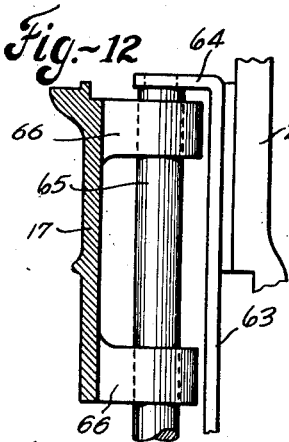
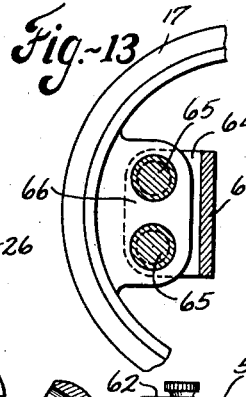
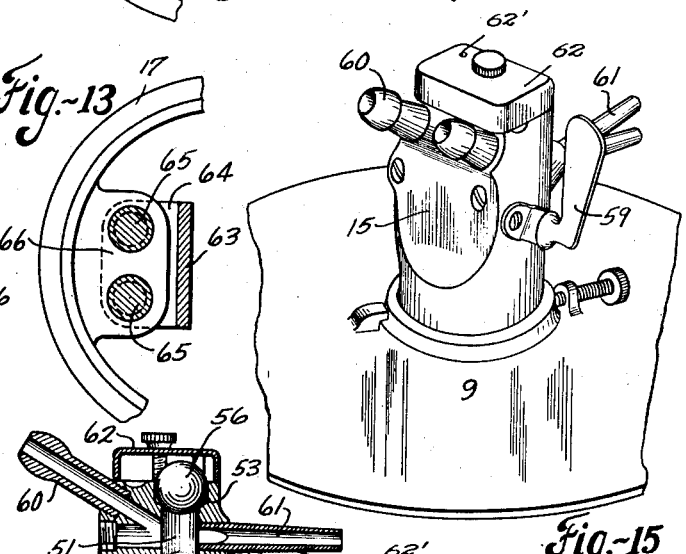
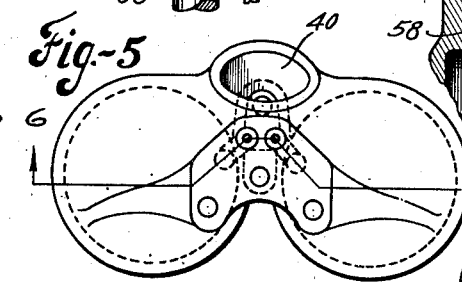
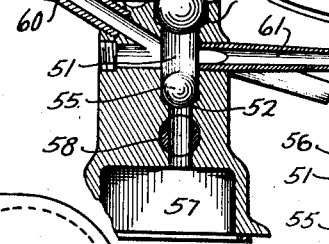
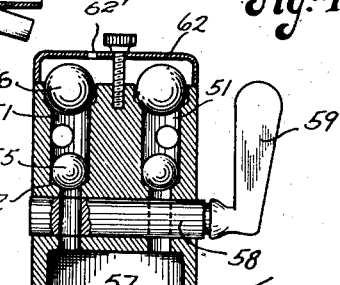
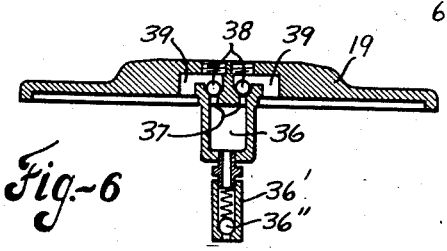
Inventor
John A. Schmitt
By F. L. Walker
Attorney

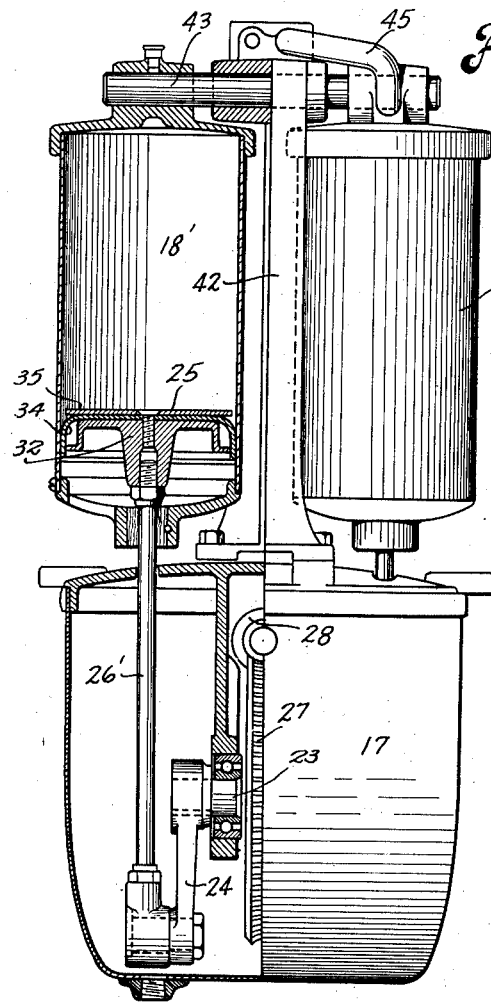
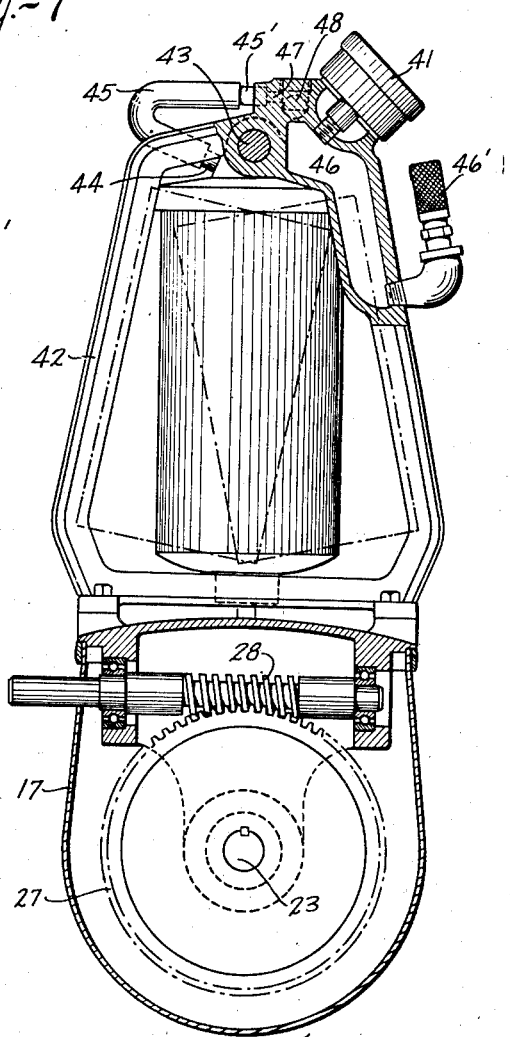
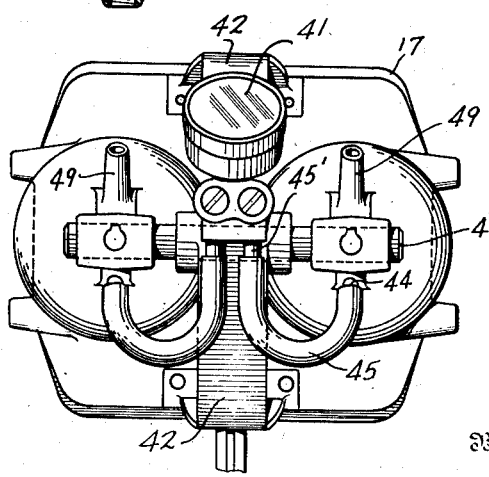

Patented Nov. 7, 1944

2,361,970

UNITED STATES PATENT OFFICE 2,361,970

MILKING APPARATUS

John A. Schmitt, Milwaukee, Wis., assignor to The Universal Milking Machine Company, Waukesha, Wis., a corporation of Wisconsin Application August 2, 1940, Serial No. 349,578

10 Claims. (Cl. 31—73)

This invention pertains to milking machines, and more particularly to a unitary portable milking apparatus adapted to either single or duplex operation.

In the present invention there is contemplated a carriage provided with carrying wheels on which is mounted the entire operating equipment, including a vacuum pump, a driving motor therefor, a milk receiver, and suitable hangers for teat cup clusters and tubing when not in use.

The object of the invention is to improve the construction as well as the means and mode of operation of automatic milking apparatus, whereby it may be more efficient in use, automatic in operation, uniform in action, having relatively few operating parts, and be unlikely to get out of repair.

A further object of the invention is to provide an assembly of milking equipment of compact form and relatively light weight and capable of being easily transported from place to place.

A further object of the invention is to provide a wheeled carriage constructed and arranged to support the several parts of the equipment assembly in cooperative relation with each other.

A further object of the invention is to provide an improved form of pulsating vacuum pump having direct connection with the teat cups, thus obviating the necessity of a special pulsator mechanism.

A further object of the invention is to provide an improved type of vacuum pump unit capable of operating the system on relatively low vacuum, and affording fixed or positive pulsations originating in the pump.

A further object of the invention is to provide a duplex pump having alternating action.

A further object is to provide an inexpensive form of pump piston and an aligning guide therefor.

A further object of the invention is to provide a direct drive assembly wherein drive belts and pulleys are eliminated.

A further object is to provide a pulsation controller for relaying the pump impulses to the teat cups.

A further object of the invention is to provide a portable milking machine assembly, including a duplex pulsating pump therefor having the advantageous structural features and inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the accompanying drawings, wherein is shown the preferred, but obviously not necessarily the only form of embodiment of the invention, Fig. 1 is a perspective view of a portable milking apparatus embodying the present invention. Fig..2 is a side elevation, partly in section, of the vacuum pump unit. Fig. 3 is also a side elevation, partly in section, of the pump unit viewed at right angles to Fig. 2. Fig. 4 is a top plan view of the vacuum pump illustrated in Figs. 2 and 3. Figs. 5 and 6 are respectively a detail top plan view and a transverse sectional view of the head of the pump shown in the preceding figures. Fig. 7 is a side elevation partly in section of a modified form of vacuum pump construction. Fig. 8 is a side elevation thereof, also partly in section, viewed at right angles to Fig. 7. Fig. 9 is a top plan view of the pump unit illustrated in Figs. 7 and 8. Fig. 10 is an enlarged detail side view, partly in section, of the piston guide shown in Fig. 2. Fig. 11 is a top plan view thereof. Figs. 12 and 13 are, respectively, a detail side elevation and top plan view, partly in section, of an alternative form of piston guide. Fig. 14 is a detail view of a further modification. Fig. 15 is a perspective view of the pulsation controller. Fig. 16 is a vertical sectional view of the pulsation controller. Fig. 17 is a further sectional view thereof at right angles to that of Fig. 16. Fig. 18 is a detail sectional view of a modification of the valve arrangement shown in Fig. 6.

Like parts are indicated by similar characters of reference throughout the several views.

In Fig. 1 of the drawings there is illustrated a complete portable assembly of milking equipment embodying the subject matter hereof. The carriage comprises a frame 1, supported on opposite carrying wheels 2 and a swiveled trailer wheel 3. Forming a part of the frame 1 is an upright arch 4 terminating in an elevated standard 5. Suspended between the side bars of the main frame, immediately at the rear of the transverse arch 4 is a duplex vacuum pump unit 6. The pump unit is operatively connected with a driving motor 7 mounted over the swiveled trailer wheel 3 on a bottom plate 8 of the main frame. The carriage is propelled by the handle bars 1a forming part of the main frame 1.

Projecting from the forward side of the arch 4 is a hanger arm 10 upon which a milk can or other receiver may be suspended.

As a precaution and further safety feature, there is preferably, although not necessarily, provided between the carrying wheels 2, a shelf or step 10a upon which the milk can 9 may rest.

Adjustably supported on the standard 5 by means of cooperating clamp members 5a and 5b and lock nut 5', are horizontal crane arms 11 from which the clusters of teat cups 12 may be suspended when not in use, and upon which the milk and air tubes may be supported while in operation. The arms 11 are independently adjustable both longitudinally and rotatively to different radial positions in horizontal planes. The arms are clamped between a series of concentric superposed collars 5a and 5b, which may be notched to receive the arms 11 and which are revoluble upon the standard 5 to which they are secured in adjusted relation by the clamp nut 5'. The teat cups 12 are of the conventional pneumatic type wherein an internal rubber inflation is rythmically expanded and contracted by admission and exhaustion of atmospheric air to and from a chamber intermediate the rubber inflation and the rigid shell of the teat cup. The interior of each teat cup inflation is connected by a flexible milk tube 13 with the milk can 9 or other receiver. The pulsating chambers of the teat cups are connected by flexible air tubes 14 to a pulsation controller unit 15 on the top of the milk receiver 9, and thence through continuing air tubes 16 to the head of the duplex vacuum pump unit 6.

It has been ascertained that a relatively low degree of vacuum, sufficient to serve the purpose, is more efficient and to be preferred, since it is safer, and the cows will better respond thereto.

Therefore, the present pump is designed to produce approximately twelve inches of vacuum and transmit pulsations at a rate of approximately forty-eight impulses per minute.

Inasmuch as the speed of operation is relatively slow, but uniform, the pump unit 6 is driven by the motor 7 through a worm gear transmission mechanism. There are shown two embodiments of vacuum pump construction, both having the same style drive. In one embodiment the pump cylinders are oscillatory, while in the other they are stationary. Referring to Figs. 2 to 6, wherein is illustrated the latter form, such pump unit includes a duo-functional crank case and transmission housing 17 on which are mounted in parallel relation a pair of cylinders 18 surmounted by a head 19, the parts being held together by a clamp rod 20 intermediate the cylinders.

Mounted in anti-friction bearings 21 in spaced hanger arms or brackets 22 within the housing 17 is a crank shaft 23, which carries at each end beyond its mounting bearings, a crank arm 24. Disposed for reciprocation in each of the cylinders 18 is a piston 25 to which is attached a piston stem 26 attached by a connecting rod or pitman 26a to the corresponding crank arm 24. To drive the crank shaft 23 at a uniform relatively slow rate of speed, there is mounted on the crank shaft 23 intermediate its supporting brackets 22, a worm wheel 27 intermeshing with a drive worm 28 on the shaft of the motor 7. As the worm gear is rotated by the motor operation, the pistons are reciprocated in alternating relation in the cylinders 18.

On each side of the crank case 17 is a piston guide, one for each piston. Such guide comprises a longitudinally slotted cylindrical bearing block 30 mounted in a correspondingly recessed lug 17a of the housing wall. The cylindrical guide bearing is capable of limited rotative adjustment within the housing lug 17a to enable automatic alignment and prevent binding, its longitudinal displacement being limited by a stop screw 30', the head of which overhangs the guide as shown in Fig. 11. Attached to the piston stem 26 is an elongated guide bar 31 disposed for sliding motion in the longitudinal slot of the cylindrical bearing block 30. The housing wall recess is provided with an entrance slot receiving the guide bar 31 of greater width than the thickness of the bar 31 to afford necessary clearance for adjustment of the bearing block 30 therein. This device maintains the proper axial alignment of the piston and enables a simple and inexpensive cup leather type of piston to be employed. The piston head comprises a circular stepped or flanged inner member 32 having a peripheral rabbet 33, which is enclosed in a cup leather 34. The cup leather 34 is held in position by a clamp plate 35. The peripheral rabbet 33 interiorly of the cup leather affords a lubricant reservoir.

The head 19 is of dual form common to both cylinders 18. It is formed with an integral recessed dependent projection forming a chamber 36 having valve openings 37 normally closed by check balls 38. The chamber 36 communicates with the respective cylinders through the valved openings and communicating passages 39. This chamber 36 also communicates with a chamber 40 over which is mounted a vacuum gage 41. The dependent hollow boss containing the chamber 36 extends from the underside of the head 19 intermediate the cylinders 18. Communicating with the bottom of the chamber 36 is a valved inlet nipple 36' controlled by the check valve 36''.

The alternative form of vacuum pump illustrated in Figs. 7, 8 and 9 employs the same crank shaft arrangement within the crank case 17 and worm drive transmission mechanism therein as before described. However, in such embodiment the cylinders 18' are independent of the crank case and transmission housing. They are suspended from an upright frame 42 attached to the top of the crank case 17 for independent oscillatory movement to and fro in alternating sequence. The frame 42 carries at its top a transverse pivotal shaft 43 upon which the cylinders are supported.

The relatively fixed piston stems or rods 26' of each piston 25 are directly connected with the crank arms 24. As the crank shaft 23 and arms 24 rotate the pistons are reciprocated in alternating relation within the cylinders and at the same time the cylinders 18' are oscillated to and fro about their pivotal connections with the transverse shaft 43. Each cylinder has a spud or nipple 44 communicating therewith and connected by a short flexible tube 45 with a second nipple 45' upon the upright supporting standard 42. The upper portion of the standard or frame 42 is recessed to form a chamber 46 corresponding to the valved chamber 36 of the initial form of construction. The nipple 45' of each cylinder communicates with said chamber 46 through a valved passage 47 having therein a check valve 48. The chamber 46 communicates with atmosphere through a valved inlet fixture 46' of conventional design and fitted with a check valve similar to valve 36'', but shown in inverted position. A gage 41 also communicates with this chamber. Directly communicating with each cylinder, through the corresponding cylinder head is a spud or nipple 49 with which the air tubes 16 are connected.

Mounted on the top of the milk receiver 9 is a pulsation controller or relay device 15. That illustrated is for duplex operation and consists of a main body having therein two spaced independent vertical bores 51, each counterbored at spaced points to provide relatively spaced valve seats 52 and 53 for gravity ball check valves 55 and 56. The bottom of the body 50 is recessed at 57. Both bores 51 communicate with the common recess 57 and therethrough directly with the milk can or other receiver. A rotary cut-off valve 58 common to both passages 51 and manually adjustable by a finger lever 59, enables regulation of the communication with the milk receiver. The respective bores 51 are interconnected intermediate the valve seats and ball valves with both the vacuum pump and with the pneumatic chambers of the tea cups through the air tubes 16 and 14 respectively. To afford such connections, spuds or nipples 60 which communicate with the bores 51 intermediate the check valves 55 and 56 provide connections for the air tubes 16 leading to the spuds or nipples 49 projecting from the cylinder heads and communicating therethrough directly with the interior of the respective cylinders. Also communicating with the bores 51 of the pulsation controller, intermediate the valves 55 and 56 are Y couplings or nipples 61 with which the air tubes 14 common to each pair of teat cups are connected. Thus the pneumatic chambers of the teat cups are directly connected without interruption with the pump cylinders. A milk tube 13 connects the interior teat receiving chambers of each cluster of teat cups to which it is common directly with the milk receiver 9. The air is exhausted from the milk receiver through a bore 51 past one or the other of the lower valves 55 and simultaneously exhausted from the teat cups by the suction influence of pump. Upon the return stroke, air is supplied to the teat cup inflation chamber, but not to the milk receiver, from which it is excluded by the closure of the lower valves 55. Any excess air pressure is relieved by the raising of an upper valve 56 which permits the excess pressure to escape through an opening 62' in the cap 62 of the unit.

In Figs. 12 and 13 is illustrated a modification of the piston guide. In this embodiment there is attached to the piston stem a flat bar 63, the ends of which are bent laterally at 64. Connecting the bent ends 64 are two parallel rods 65 which slide in corresponding holes in lugs 66 formed upon the inner wall of the crank housing 17. Fig. 14 illustrates a similar form employing but one rod 65' in lieu of the double rods.

In Fig. 18 there are shown a pair of disc type valves 67 controlling the passages 39 to the respective cylinders. These valves 67 are supported in position by wire loops or retainers 68. They perform the function of the ball check valves 38 of the previously described assembly, which valves 38 are omitted when the disc valves are employed. The vacuum chamber 36, being common to both valves, enables equalization of the suction or vacuum influence of each piston, the degree of which is determined by adjustment of the relief inlet 36'. That is to say, by adjustment of the inlet relief valve 36'' whenever a predetermined degree of vacuum has been achieved, the valve will automatically open to admit sufficient air to prevent any further increase of the vacuum effect. Further, by connecting the vacuum gage 41 with this common chamber 36, the gage is common to both cylinders and becomes stabilized. If connected directly with either one of the cylinders, a conventional gage would fluctuate alternately between the maximum degree of vacuum, usually, but not necessarily, approximately twelve inches, and zero. One capable of both pressure and suction indications would show alternate vacuum and compression. However, the small common chamber 36 being under constant suction influence of the cylinders alternately and protected from compression influence by the valves 38 or 67, the gage indicates only the degree of vacuum and is stabilized. Upon the suction stroke of either cylinder, air is drawn from the milk receiver 9 and from the teat chambers of the teat cups, and from the pulsation chambers of a part of the teat cups until there is attained the maximum degree of vacuum for which the relief valve 36'' has been set. Thereupon a small quantity of air is admitted through the vacuum relief valve 36'', which is sufficient to further increase the vacuum influence and maintain it at the predetermined maximum.

It is not practical for sanitary reasons to mount the vacuum gage 41 and the vacuum relief valve 36'' on the pulsation controller or on the lid of the milk pail or receiver. The compression relief valves 56 may, if desired, be located directly on the cylinder heads in direct communication with the cylinders. It has been found convenient, however, to incorporate it in the pulsation controller unit. These ball valves are sufficiently heavy, or may be subjected to yielding spring resistance, to resist opening until the air pressure delivered to the teat cup pulsation chambers has reached a predetermined degree. Thereupon, to prevent accumulation of excess pressure, the compression relief valves 56 automatically open to permit escape of excessive air under pressure. Ordinarily, the teat cup pulsating chambers are opened to atmospheric air alternately with the suction impulses. It is found, however, that positive delivery of air to the teat cup chambers under a moderate pressure, determined by the resistance of the relief valves 56, affords a more positive, quick, snappy action, which greatly improves the milking operation.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:
1. In a portable milking apparatus, a carriage including a frame, a pair of oppositely disposed carrying wheels adjacent the front of the frame, a support at the rear of the frame, an upright contiguous to the carrier wheels, a support at the forward side of the upright for a milk receiver, crane arms carried by the upright for supporting milk and air conduits, a milk receiver, an air pump and an electric motor supported on the frame on a substantially common level approximately coincident with the horizontal axial plane of the carrying wheels, the milk receiver on said support extending forwardly of the carrying wheels, the electric motor at the rear of the frame disposed substantially over said rear support, the air pump being located intermediate the milk receiver and electric motor, the arrangement and disposition of the milk receiver, air pump and electric motor being such as to afford a stable structure having a low center of gravity, upwardly and rearwardly extending handle arms connected to the frame, a teat cup cluster of the pneumatic vibratory type, a milk conduit connecting the interior of the teat cups directly to the milk receiver, a pulsation control unit mounted on top of the milk receiver, and air conduits connecting the pneumatic pulsating chambers of the teat cups through said pulsation controller directly with the pump.

2. In a portable milking apparatus, a carriage including a frame, a pair of carrying wheels at the forward portion thereof, a support at the rear thereof, a milk receiver, a vacuum pump and an actuating motor mounted on said frame in fore and aft aligned relation, and supported on a common plane substantially coincident with the horizontal axial plane of the carrying wheels, the arrangement and disposition of said parts being such as to afford a stable compact assembly of low center of gravity, a driving connection between the motor and the pump, a teat cup cluster, a milk conduit connecting the teat cups of the cluster directly with the milk receiver, and an air conduit connecting the vacuum pump with both the teat cups and the milk receiver.

3. In a portable milking apparatus, a cluster of teat cups, a milk receiver, a vacuum pump, an actuating motor therefor, a milk conduit connecting the teat cups with the milk receiver, an air conduit connecting the teat cups with the vacuum pump, and valve means actuated by fluctuations of air pressure induced in the air conduit by the vacuum pump for alternately connecting the air conduit with the milk receiver under suction influence of the pump and the atmosphere upon compressive influence of the pump, a wheeled carriage therefor on which the milk receiver, the vacuum pump and the motor are mounted in a fore and aft aligned relation, with the milk receiver removably supported at the front of the carriage, the motor at the rear of the carriage and the pump intermediate the motor and milk receiver, the said members being supported substantially in a common plane approximately coincident with the axis of the wheels of the wheeled carriage, the construction and arrangement being such that the assembly is of compact form and possessed of a low center of gravity whereby it is stabilized for transport over uneven surfaces.

4. In a milking apparatus, a cluster of teat cups, a milk receiver, a vacuum pump, milk and air conduits operatively interconnecting the teat cups, the milk receiver and the pump, an actuating motor for the pump, said pump including a duo-functional gear case and transmission housing, a pair of cylinders supported thereon, reciprocatory pistons in said cylinders, a crank shaft within the crank case and transmission housing with which the pistons are connected for alternating operation, a worm wheel connected with said crank shaft, a worm intermeshing with the worm wheel and driven by the motor, an air intake chamber forming a part of the pump structure and common to both cylinders, a valved intake to said chamber, independently operable valves between each cylinder and the air intake chamber, independent discharge outlets from the respective cylinders, and a distantly located unit communicating with the milk receiver, air conduits connecting the respective pump cylinders with said unit through which the air flow alternates under alternate compression and suction influence of the pump, pressure operated valves in said unit for intermittently connecting the air conduits with atmosphere, and suction operated valves also in said unit for connecting the air conduits with the milk receiver alternately with the operation of the pressure operated valves.

5. In a milking apparatus wherein a cluster of pneumatic pulsating teat cups are connected with a milk receiver common to all the teat cups and with a vacuum pump by which different teat cups of the cluster are subjected to alternate compression and suction influence in alternating sequence, said vacuum pump including a motion transmission housing, a pair of cylinders, reciprocatory pistons therein, actuating means for operating the pistons in alternating sequence, an air intake chamber communicating with atmosphere comprising a part of the pump structure and common to both cylinders, independent inlet valves from said intake chamber to the respective cylinders, independent alternately suction and discharge conduits connecting the respective cylinders with the milk receiver, and a unit with which the conduits communicate, including relief valves automatically opening the conduits to atmosphere under pressure influence of the pump and including suction valves automatically connecting the conduits with the milk receiver under suction influence of the pump.

6. In a milking apparatus wherein a cluster of pneumatic pulsating teat cups are connected with a milk receiver common to all the teat cups and with a vacuum pump by which different teat cups of the cluster are subjected to alternate compression and suction influence in alternating sequence, said vacuum pump including a motion transmission housing, a pair of cylinders, reciprocatory pistons therein, actuating means for operating the pistons in alternating sequence, separate air conduits connecting the respective cylinders with different teat cups of the cluster, through which alternating suction and compression impulses are transmitted by the alternating movement of the pistons, a chamber in the pump head common to both cylinders, a vacuum gage communicating with the chamber operative to indicate the degree of suction influence exerted through the air conduits, valve means automatically protecting the gage against compression influence, and a manually adjustable air inlet valve to the chamber for regulating the suction influence of the pump, and separate valved connections between said separate air conduits and the milk receiver and atmosphere by which communication is established with the milk receiver under suction influence of each pump cylinder and communication is established with atmosphere under compression influence of each pump cylinder.

7. In a milking apparatus wherein a cluster of pneumatic pulsating teat cups are connected with a milk receiver common to all the teat cups and with a vacuum pump by which different teat cups of the cluster are subjected to alternate compression and suction influence in alternating sequence, said vacuum pump including a power transmission housing, a pair of cylinders, reciprocatory pistons therein, actuating means for operating the pistons in alternating sequence, an elongated flat piston stem for each piston, a round longitudinally slotted guide for each piston stem, and mounting lugs within the pump within which the slotted guide is mounted for limited rotary adjustment.

8. In a milking apparatus wherein a cluster of pneumatic pulsating teat cups are connected with a milk receiver common to all the teat cups and with a vacuum pump by which different teat cups of the cluster are subjected to alternate compression and suction influence in alternating sequence, said vacuum pump including a motion transmission housing, a pair of cylinders, reciprocatory pistons therein, actuating means for operating the pistons in alternating seqquence, a supporting standard carried by the housing upon which the cylinders are mounted for alternating to and fro swinging motion incident to reciprocation of their cylinders, a valved air inlet chamber in the supporting standard common to both cylinders, valved passages independently connecting each of the swinging cylinders with said chamber, and unrestricted intake-discharge openings in each cylinder through which the respective cylinders communicate with different teat cups of the cluster for transmission of alternating suction and compression impulses.

9. In a milking apparatus wherein a milk receiver and associated teat cups are subjected to intermittent suction pulsations, a vacuum pump connected thereto and including a pair of cylinders, alternately operating pistons therein, a vacuum chamber comprising a part of the pump structure and common to both cylinders, valved passages connecting the respective cylinders therewith, check valves in said passages, and an air inlet relief valve mounted on the pump structure connecting said common vacuum chamber with atmosphere, and operative to admit atmospheric air to one or the other of the cylinders when the vacuum induced by the operation of said pump exceeds a predetermined degree.

10. In a milking apparatus wherein a milk receiver and associated teat cups are subjected to intermittent suction pulsations, a vacuum pump connected thereto and including a pair of cylinders, alternately operating pistons therein, a vacuum chamber comprising a part of the pump structure and common to both cylinders, valved passages connecting the respective cylinders therewith, check valves in said passages, a manually adjustable air inlet valve for automatically admitting atmospheric air to the vacuum chamber to reduce the suction effect to a predetermined maximum degree, and a vacuum gage mounted on the pump structure and communicating with said common chamber and operative to indicate the degree of vacuum induced by the alternate operation of the pistons in said cylinders, said gage being protected from fluctuation of vacuum incidental to reversal of the pistons and from compression influence thereof by said valves.

JOHN A. SCHMITT.